(No Model.) 2 Sheets—Sheet 1.
W. P. & J. W. BETTENDORF.
METHOD OF AND APPARATUS FOR MAKING METALLIC WHEELS BY ELECTRICITY.
No. 440,534. Patented Nov. 11, 1890.
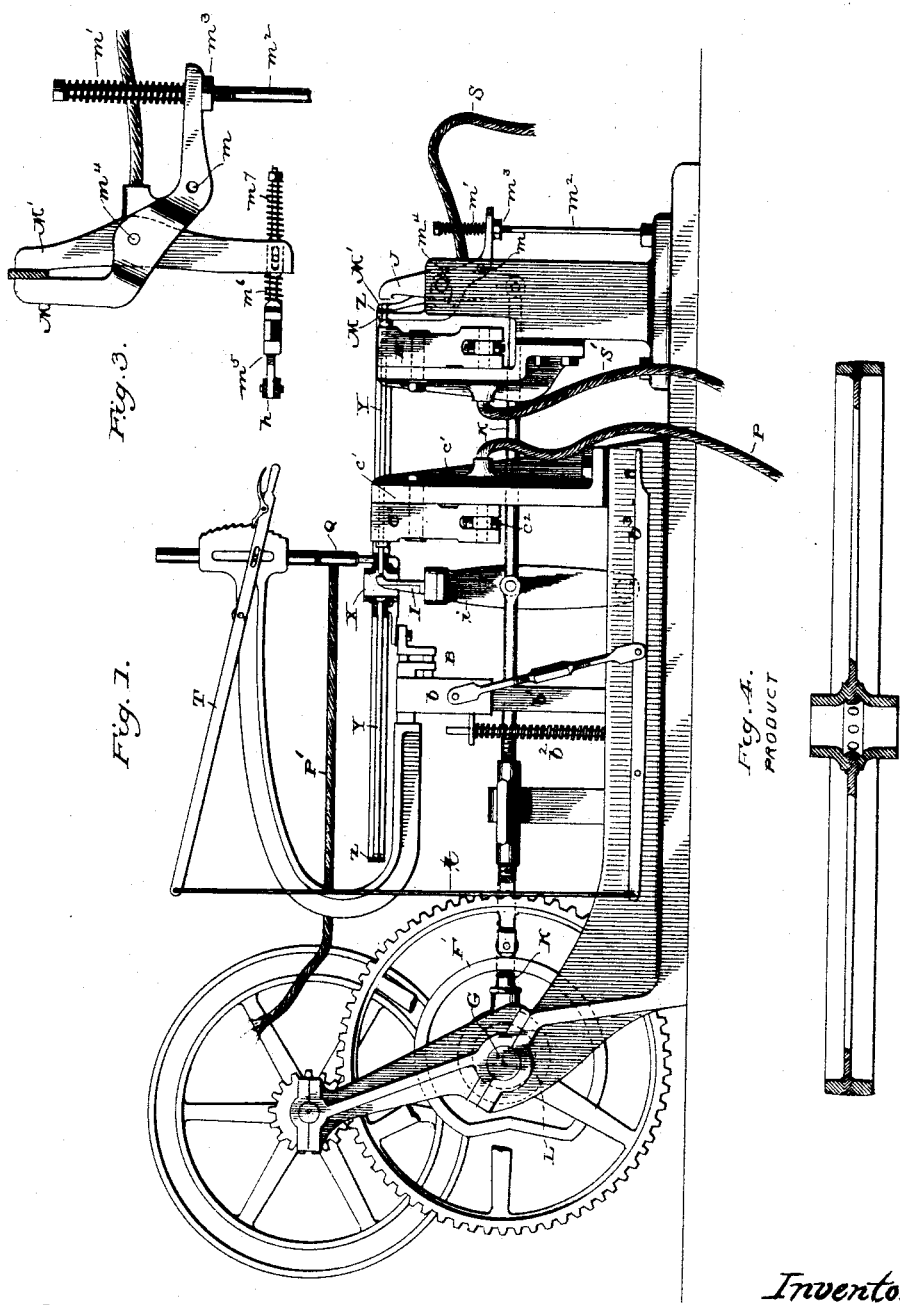

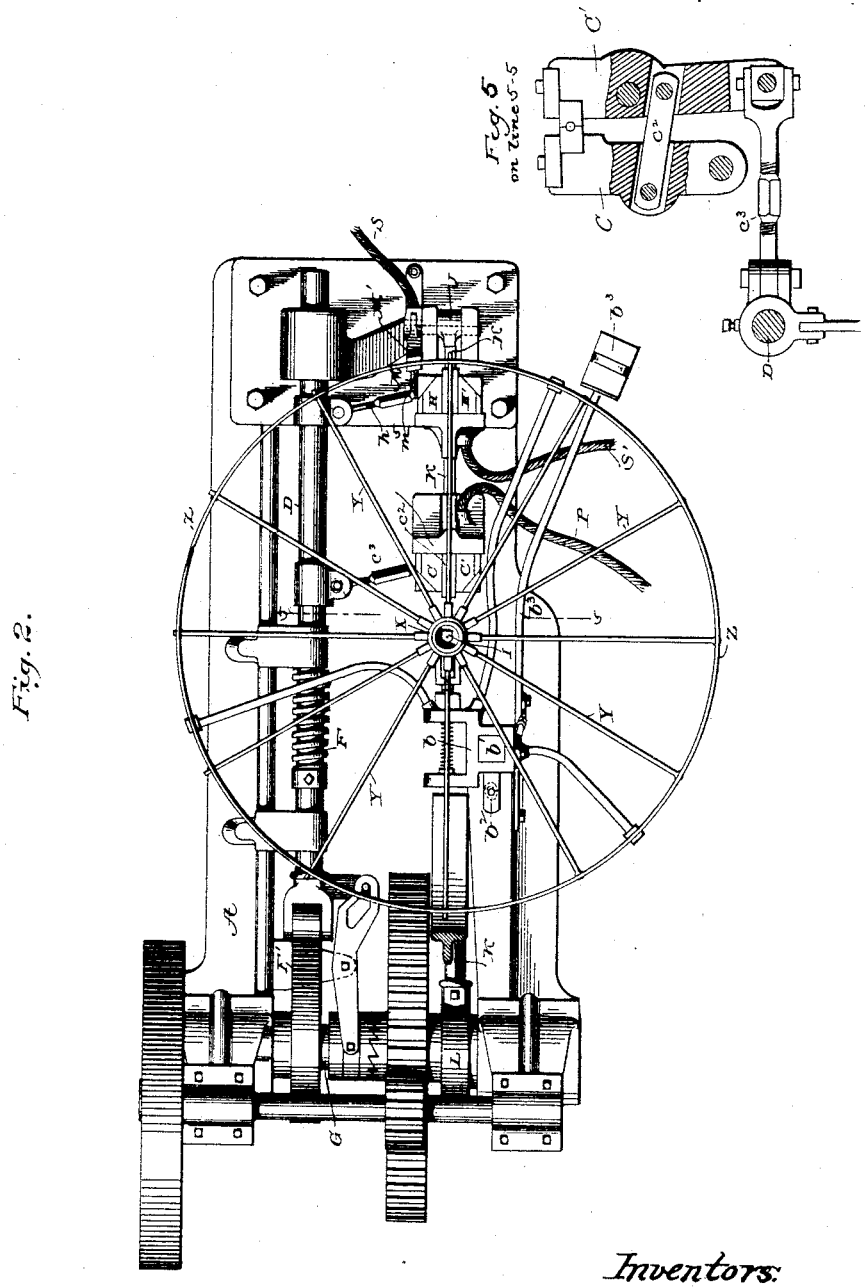

UNITED STATES PATENT OFFICE.

WILLIAM P. BETTENDORF AND JOSEPH W. BETTENDORF, OF DAVENPORT, IOWA.

METHOD OF AND APPARATUS FOR MAKING METALLIC WHEELS BY ELECTRICITY.

SPECIFICATION forming part of Letters Patent No. 440,534, dated November 11, 1890.

Application filed May 26, 1890. Serial No. 353,183. (No model.)

*To all whom it may concern:*

Be it known that we, WILLIAM P. BETTENDORF and JOSEPH W. BETTENDORF, of Davenport, in the county of Scott and State of Iowa, have invented certain Improvements in Methods of and Means for Making Metallic Wheels, of which the following is a specification.

This invention has reference to the manufacture of metallic wheels in which the spokes are forged to the hub and to the rim.

The invention relates, first, to the method of uniting spokes to a hub, consisting in introducing the spoke into an opening in the hub, heating the two parts while in this relation by means of an electric current passed through them, and subjecting the spoke while thus heated to pressure in an endwise direction. This part of the invention also involves the application of the spoke to the rim in like manner.

The second part of the invention consists of a machine of novel construction for carrying into practice the method above recited.

In operating the machine the hub and the tire are placed in position therein and the spoke inserted into the hub and at the opposite end through the tire. While the parts are in these relations the machine operates on both ends of the spoke at once, the inner end being headed and also upset or enlarged immediately outside of the hub, while the other end of the spoke is headed outside of the tire and upset or enlarged against its inner face.

In the accompanying drawings, Figure 1 is a side elevation of my improved machine. Fig. 2 is a top plan view of the same. Fig. 3 is a side elevation of the clamping mechanism for holding the tire in position. Fig. 4 is a view of the product. Fig. 5 is a section on the line 5 5, Figs. 1 and 2, illustrating the manner in which the spoke-clamping jaws are mounted and operated.

Referring to the drawings, X, Y, and Z represent, respectively, the hub, the spokes, and the tire which it is the office of the machine to unite in the form of a wheel.

A represents the main frame of the machine, which may be in any form adapted to sustain the various movable parts.

B is an annular hub-supporting arm attached to an arm $b$, arranged to slide up and down on a standard $b'$ under the influence of a lifting-spring $b^2$ and a treadle or depressing-lever $b^3$. This arm is intended to hold the hub in position during the introduction and the fastening of the spokes and to lift the parts in order to carry the spokes clear of the clamping devices, so that the wheel may be turned to bring the successive spokes in position to be acted upon.

C C' are two co-operating jaws to clamp the spokes one at a time immediately outside of the hub. They are connected by horizontal pivots to a supporting-standard $c'$ and connected with each other by a link $c^2$, whereby they are caused to act in unison. They are operated by a link $c^3$, extending laterally from jaw C' to a sliding rod D, which is guided in the main frame and moved to and fro by a spring F and an opposing cam F' on the main shaft G.

H H' are a second pair of clamping-jaws arranged to grasp the spoke near the inner face of the tire. They are pivoted, connected, and operated from the rod D by a link $h$ in the same manner as the clamps C C'.

I is a heading-tool, fixed on the top of the pivoted arm $i$ and adapted to act within the hub against the inner end of the spoke.

J is a second heading-tool in the form of a centrally-pivoted lever, to act on the outer end of the spoke.

Both heading devices are jointed and operated by a rod K, one end of which encircles an eccentric L on the main shaft, so that the two headers are operated in unison while the spoke is tightly held at both ends by the clamp.

In order that the header I may act to upset and enlarge the spoke both inside and outside of the hub, the hub-support B is connected to its sustaining-sleeve, so that it may slide horizontally to a limited extent in order that the hub may follow the spoke as the latter is shortened. The outer end of the spoke is upset and enlarged both inside and outside of the tire. In order that this may be done with certainty, we provide a clamp composed of jaws M M' to hold the tire in position. The inner jaw M, as shown in Fig. 3, is pivoted at $m$ to the frame and urged outward by a spring $m'$, mounted on a fixed rod $m^2$, which is provided with an adjustable stop-nut $m^3$. This nut, limiting the outward movement of jaw M, in part determines the amount of material to be headed down on the outside. The second and outer jaw M' is pivoted to jaw M at $m^4$, and is operated by a link or rod $m^5$, extending from its lower end to the arm $h$, by which the clamps H H' are actuated, the arrangement being such that when the clamps H H' are closed to grasp the spokes the clamps M M' are caused to grasp and hold the tire. As the header advances and heads the outer end of the spoke the clamps M M'' yield inward—that is to say, toward the hub—thus permitting the spoke to be enlarged immediately inside of the tire. The rod $m^5$ has a slotted connection with the jaw M, and is provided on opposite sides of the arm with springs $m^6 m^7$. This yielding connection permits the rod to continue its movement after the tire is grasped and also permits the clamp M M' to swing inward without straining or breaking the parts.

The mechanisms above described are adapted to upset simultaneously the two ends of a heated spoke.

In order to heat the spoke and the adjacent parts of the hub and tire while they are in place in the machine and to such temperature that the upsetting action will be accompanied by a welding of the parts together, we make provision for conducting suitable electrical currents through the parts to be heated. The currents may be derived from a dynamo or other generator direct, or from a generator or transformer, and the conductors and contact devices may be modified in detail provided they act in essentially the same manner as these herein shown.

In order to heat the inner end of the spoke and the adjacent portion of the hub we connect the conductor P, forming one terminal of a charged electric circuit, to the standard $c'$, which sustains the inner spoke-clamps C C', and connect the conductor P', forming the other terminal of the circuit, to a vertically-sliding pressure-bar Q, which is mounted in an overhanging arm of the main frame and arranged to act against the hub directly over the point at which the spoke to be heated is inserted. When this pressure device is lowered into contact with the hub, the current passes through the latter, and thence through the end of the spoke and the clamps, quickly heating the end of the spoke and the socket or mortise of the hub to a welding temperature, so that when the header acts it causes the spoke and hub to weld together, so that they become practically one. The outer end of the spoke and the surrounding portion of the tire are heated in like manner by an electric current introduced through terminal conductors S S', connecting the former to the clamp M and the latter to the standard which sustains the outer spoke-clamps. This second current may be derived from the same source as the first or from an independent source, as desired. The two clamp-sustaining standards, the inner heading device, and the hub-support are all to be insulated, as shown.

The pressure or contact device may be operated in any suitable manner; but we commonly connect it to one end of a lever T, which is connected at the opposite end by rod $t$ with the foot-lever of the hub-support, as shown in Fig. 1, so that when the lever is depressed and the hub lowered to carry the spoke between the clamps the circuit will be automatically closed, and vice versa.

Having thus described our invention, what we claim is—

1. The improvement in the art of attaching metal spokes to metal wheel hubs and tires, consisting in introducing the end of the spoke into the other member, heating the contiguous portion of the two members to a welding temperature by directing an electric current therethrough, and finally upsetting the spoke to complete the welding operation.

2. The improvement in the art of manufacturing metal wheels, consisting in introducing the ends of the spokes into mortises in the hub, heating the contiguous parts to a welding temperature by directing an electric current therethrough, and finally forcing the parts into contact while thus heated to effect a welded union between them.

3. The improvement in the art of manufacturing metal wheels, consisting in introducing the spoke at one end into the hub, passing an electric current through the hub and spoke and thereby raising their contiguous portions to a welding temperature, and then upsetting the spoke, as described, in such manner as to weld the parts together and to produce enlargements of the spokes on the inside and outside of the hub.

4. The improvement in the art of manufacturing metal wheels, which consists in passing the end of the spoke through a hole in the tire, directing an electric current through the contiguous portions of said parts, and thereby raising their temperature to a welding heat, and finally upsetting the end of the spoke, and thereby welding the parts together.

5. In a machine for manufacturing metal wheels, the combination of a hub-support, a clamp to grasp the spoke outside of the hub, a heading-tool to act within the hub, a source of electric supply, and conductors arranged to direct a heating-current through the hub and the inserted end of the spoke, substantially as described and shown.

6. In a machine for manufacturing metal wheels, the combination of the hub-support, the spoke-clamp adjacent thereto, the heading-tool, the movable pressure device to act upon the hub, and a charged electric circuit having its terminals connected, respectively, with the spoke-clamp and the pressure device.

7. In a machine for welding metal spokes into metal hubs, the combination of an insulated heading-tool to act on the spokes within the hub, a clamp to grasp the spoke outside of the hub, a movable conductor adapted to act upon the hub, and a source of electric supply having its terminals connected, respectively, with the movable conductor and with the spoke-clamp.

8. In a machine for manufacturing metal wheels, the combination of two clamps adapted to grasp a spoke near its opposite ends, two heading-tools to act on the respective ends of the spoke, a source of electric supply, conductors adapted to direct the electric current through the inner end of the spoke, and the applied hub and conductors arranged to direct the current through the outer end of the spoke and the adjacent portion of the tire, whereby the two ends of the spoke may be heated and secured to the hub and tire, respectively.

9. In a machine for manufacturing wheels, the combination of mechanisms adapted to upset the two ends of the spoke, a source of electric supply and conductors adapted to direct an electric current through the two ends of the spoke independently.

10. In a machine for manufacturing metal wheels, the combination of the clamp to grasp the outer end of the spoke, the adjacent heading-tool, the clamp to grasp the tire, and a source of electric supply having its terminals connected, respectively, with the spoke-clamp and the tire-clamp, whereby the heating-current is directed through those portions of the spoke and tire which are to be acted upon.

11. In a machine for electric welding, the combination of a clamp and its operating mechanism to hold the metal under treatment, conductors by which an electric current is directed through said metal, and a circuit-controlling switch connected with and operated by the clamping mechanism, whereby the closing of the clamp is caused to initiate the heating action.

In testimony whereof I hereunto set my hand this 14th day of May, 1890, in the presence of two attesting witnesses.

WILLIAM P. BETTENDORF.
    JOSEPH W. BETTENDORF.

Witnesses:
    G. N. MEVES,
    THOS. B. CARSON.